United States Patent [19]
Lowery et al.

[11] Patent Number: 5,726,385
[45] Date of Patent: Mar. 10, 1998

[54] THIN WALL ELECTRICAL OUTLET BOX

[75] Inventors: Gary L. Lowery, Southhaven, Miss.; Jay C. Medeiros, Collierville; Mark Bordwell, Memphis, both of Tenn.

[73] Assignee: Thomas & Betts Corporation, Memphis, Tenn.

[21] Appl. No.: 581,278

[22] Filed: Dec. 29, 1995

[51] Int. Cl.⁶ ............................................. H02G 3/08
[52] U.S. Cl. ............................................. 174/50
[58] Field of Search ..................... 174/50, 53, 48; 220/3.2, 3.3

[56] References Cited

U.S. PATENT DOCUMENTS

| | | | |
|---|---|---|---|
| 1,763,160 | 6/1930 | Knight | 220/3.94 |
| 1,898,282 | 2/1933 | Almerantz | 220/3.8 |
| 2,457,023 | 12/1948 | Zelt | 174/50 |
| 2,867,349 | 1/1959 | Parker, Jr. | 220/3.3 |
| 2,924,639 | 2/1960 | Zelt | 174/59 |
| 2,959,633 | 11/1960 | Palmer et al. | 174/50 |
| 3,015,408 | 1/1962 | Campbell et al. | 220/3.4 |
| 3,215,769 | 11/1965 | Slater | 174/53 |
| 3,263,853 | 8/1966 | Smith | 220/484 |
| 3,885,852 | 5/1975 | Grove | 174/53 X |
| 4,163,503 | 8/1979 | McKinnon | 220/3.8 X |
| 4,438,859 | 3/1984 | Solek | 220/3.2 |
| 4,693,438 | 9/1987 | Angell | 174/58 X |
| 5,084,596 | 1/1992 | Borsh et al. | 174/53 |
| 5,125,199 | 6/1992 | Whitney et al. | 174/48 X |
| 5,359,152 | 10/1994 | Hone-Lin | 174/53 |
| 5,527,990 | 6/1996 | Comerci et al. | 174/48 |

FOREIGN PATENT DOCUMENTS

| | | | |
|---|---|---|---|
| 1191952 | 5/1970 | United Kingdom | 174/50 X |
| 2141404 | 12/1984 | United Kingdom | 174/52.1 X |

*Primary Examiner*—Hyung S. Sough
*Assistant Examiner*—Dean A. Reichard
*Attorney, Agent, or Firm*—Michael L. Hoelter; Salvatore J. Abbruzzese

[57] ABSTRACT

An improved electrical outlet box having thin wall construction and localized elements for structurally reinforcing the box. The thin wall outlet box includes a bottom wall and a perimeter wall perimetrically bounding the bottom wall and an open upper end defined by a lip. The perimeter wall comprises a plurality of sidewalls which join together to form corners. Each of the sidewalls has a reinforcement rib longitudinally extending substantially parallel to the lip and projecting inwardly toward the interior of the box. In addition, each of the corners has an outwardly projecting rib which extends downwardly from a point on the corner between the lip and the bottom wall onto the bottom wall.

22 Claims, 7 Drawing Sheets

THIN WALL ELECTRICAL OUTLET BOX

FIELD OF THE INVENTION

The present invention relates generally to electrical outlet boxes. More particularly, the present invention relates to an electrical outlet box having a thin wall design and localized elements for structurally reinforcing the walls of the box.

BACKGROUND OF THE INVENTION

An electrical outlet box provides a termination point for wires carrying electrical current through buildings, houses and other structures. Wiring entering an outlet box is typically connected to a particular electrical fixture or receptacle such as a lighting fixture, outlet or switch. Outlet boxes may be employed in concealed-wiring installation in which they are located within a wall or ceiling. Alternatively, outlet boxes may be used in exposed-conduit wiring installations where they are exteriorly mounted to a wall, column or ceiling and exposed to various environmental conditions.

Outlet boxes isolate and protect the electrified components contained within; therefore, it is important that electrical outlet boxes remain in tact due to the potentially hazardous nature of their contents. Accordingly, outlet boxes are typically designed in order to withstand a certain amount of force which may be imparted onto the box. An outlet box may be impacted and crushed or may be pulled or twisted apart by a force acting on the conduit which is attached to the box. If the force exceeds a certain magnitude the box will plastically deform and rupture resulting in exposure of the wires and components contained within.

Outlet boxes are often used in applications in which they may be subjected to destructive forces. For example, an outlet box which is exteriorly mounted in an industrial environment may be struck by machinery being operated on a manufacturing floor, or by hand trucks or forklifts traveling through a warehouse or by objects carried by individuals. Furthermore, in retail environments which simulate the "warehouse" environment outlet boxes are often exteriorly mounted and subject to possible impact by customers and/or employees. Interiorly mounted boxes are also subject to impacts and other forces since they are often only partially protected by a thin wall of sheet rock material or other thin covering.

The forces which an outlet box may encounter could be of such a magnitude to cause the box to rupture thereby exposing electrified wires. A ruptured outlet box presents a hazardous condition since it creates the potential for the wires to ground or short resulting in the production of sparks which could ignite nearby combustible material. In addition, once the electrified wires within the box are exposed, electrocution of an individual may result. One might be electrocuted directly, by coming into contact with the wires, or indirectly, by coming into contact with a conducting material which is contacting the exposed wires.

Due to the dangers created by a ruptured electrical outlet box, outlet boxes are designed in order to meet certain minimum structural requirements. Prior to 1993, the National Electric Code (NEC) had addressed the structural requirements for outlet boxes by requiring that sheet steel boxes less than 100 cubic inches in size have a wall thickness of at least 0.0625 inches.

In 1993 the NEC was revised and an exception to the minimum wall thickness for outlet boxes was issued. The NEC, through section 370–40(b) exception No. 1, permits metal outlet boxes to be made of thinner material as long as they are equivalent in strength and other characteristics to outlet boxes having a minimum thickness 0.0625 inches.

Outlet boxes of the prior art have met the strength requirement by making the walls correspond to the minimum thickness specified by the NEC. As a result of the NEC exception, it is now desirable to develop an outlet box having as thin a wall as possible while still maintaining the structural strength of a box having a wall thickness of at least 0.0625 inches.

A thin wall outlet box has the advantage of offering significant cost savings for outlet box manufacturers since less material is needed. Moreover, a thinner material is easier to work with in the manufacturing process thereby reducing manufacturing time and the cost of machinery needed to produce the thin walled outlet box.

Thin metal walls of the prior art have been reinforced by placing more material at certain locations on the wall. Such reinforcing structures are typically referred to as ribs and allow for the strength of the wall to be increased without the need of increasing the overall thickness of the wall. The location of the ribs is very important in order to obtain maximum strength with the least amount of material. The use of ribs to increase the structural integrity of metal electrical outlet boxes is, however, not found in the prior art.

Accordingly, it is desirable to provide an outlet box having a material saving thin wall design while still maintaining the structural requirements of the NEC code so that the electrical wiring and components contained within the box are adequately protected.

SUMMARY OF THE INVENTION

It is an object of the invention to provide an electrical outlet box of thin wall construction.

It is a further object of the invention to provide an electrical outlet box having localized structural reinforcement means disposed on the sidewalls and corners of the box.

It is still a further object of the invention to provide an electrical outlet box having reinforcing ribs disposed on the sidewalls and corners of the box.

In the efficient attainment of these and other objects, the present invention provides a thin wall electrical outlet box having localized reinforcing means. The outlet box includes a bottom wall and an upwardly extending perimeter wall bounding the bottom wall and defining a lip and an upper end. The perimeter wall includes a plurality of upwardly extending sidewalls which are joined together forming a plurality of corners. The reinforcing means includes a sidewall reinforcing means which is disposed on each of said sidewalls adjacent to said lip and corner reinforcing means being located adjacent to each of said corners.

As more specifically described by way of the preferred embodiment herein, the outlet box includes a rib disposed on each of the sidewalls. The ribs longitudinally extend along the sidewall substantially parallel to the lip and project inwardly toward the interior of the box. The corner reinforcement includes a plurality of outwardly projecting ribs. Each rib extends upwardly from the bottom wall to a point on the corner between the lip and the bottom wall.

DETAILED DESCRIPTION OF THE PREFERRED EMBODIMENTS

Figure 1:
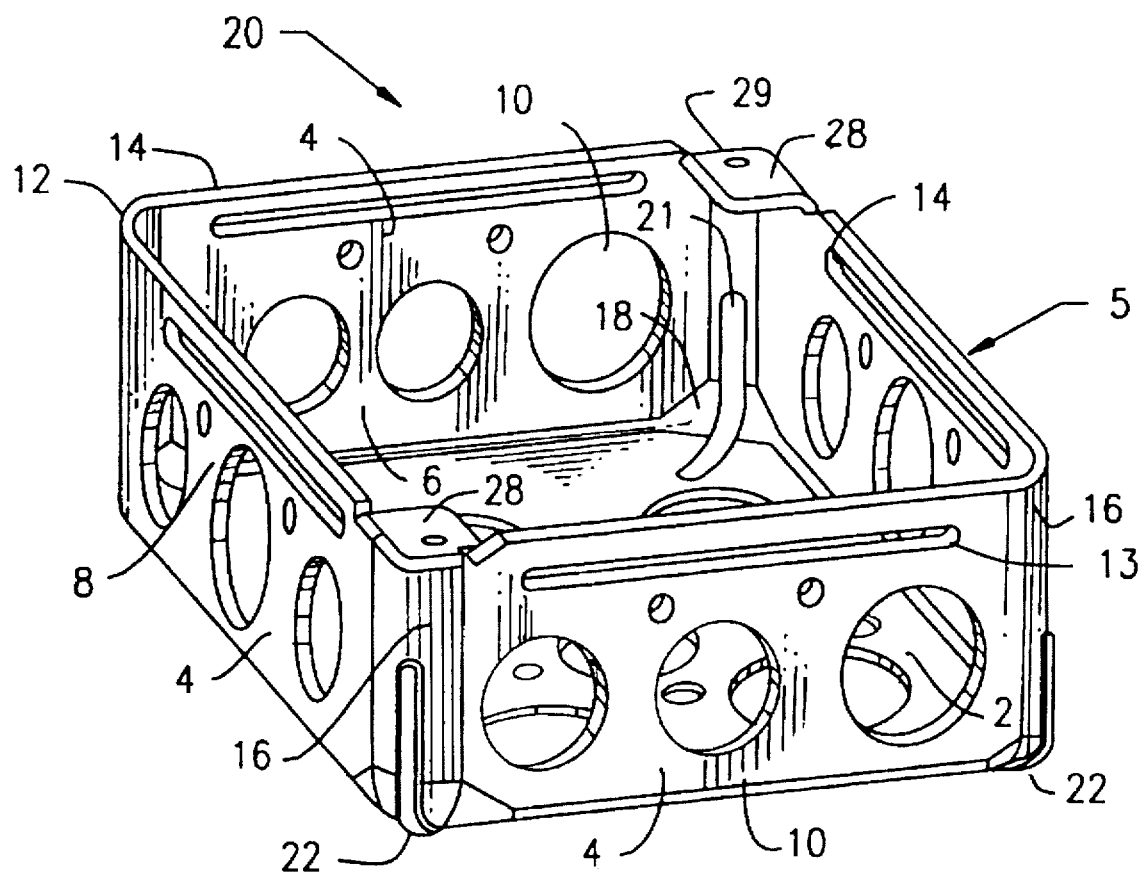
FIG. 1 is a prospective view of the thin wall electrical outlet box of the present invention.

With reference to FIG. 1, an electrical outlet box 20 is shown. Outlet box 20 is a metallic member including a bottom wall 2 perimetrically bounded by a perimeter wall 5 which extends upwardly from bottom wall 2 to define a box interior 6. Perimeter wall 5 comprises a plurality of substantially straight sidewalls 4. In the preferred embodiment perimeter wall 5 comprises four sidewalls 4. Perimeter wall 5 also comprises a plurality of corners 16 which are formed where the sidewalls 4 are connected.

Additionally, outlet box 20 has an open upper end 8 including a perimetrical lip 12. A pair of diagonally opposed ears 28 are formed on lip 12 and extend inwardly toward the box interior 6. Each of the ears 28 has an aperture 29 therethrough which is adapted to receive mounting hardware such a screw (not shown) which is used to secure a cover plate (not shown) onto the box 20. Outlet box 20 further includes a plurality of openings 10 formed in bottom wall 2 and sidewalls 4 to permit conduit and wires (not shown) to enter the box.

Figure 2:
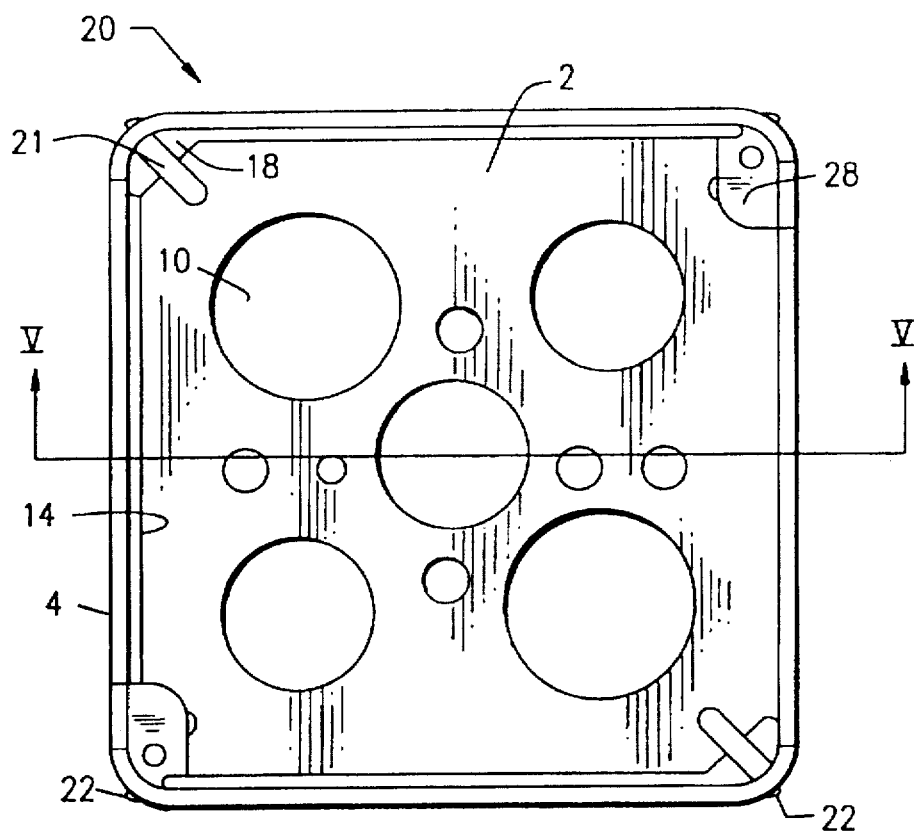
FIG. 2 is a top plan view of the electrical outlet box of FIG. 1.
Figure 3:
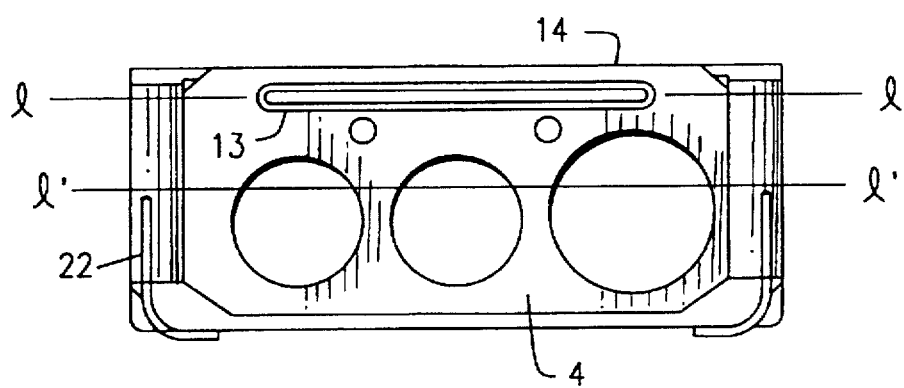
FIG. 3 is a side elevational view of the thin wall electrical outlet box.
Figure 5:
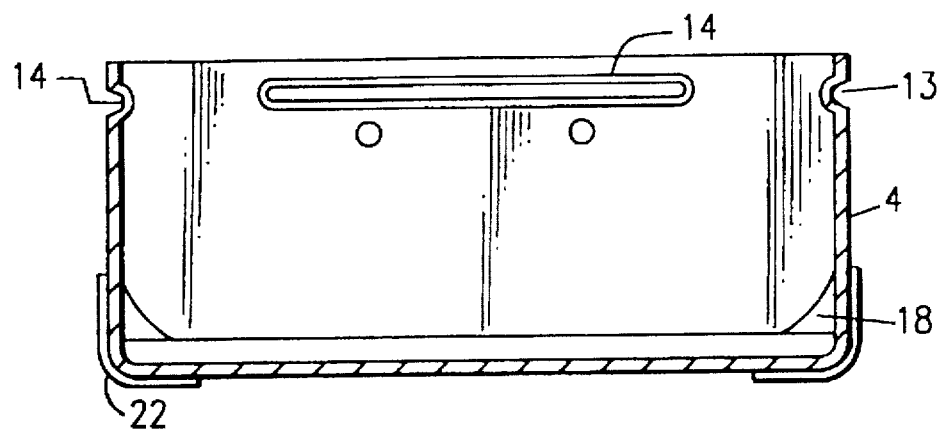
FIG. 5 is a vertical cross-section the thin wall electrical outlet box of FIG. 2 taken through lines V—V thereof.
Figure 5A:
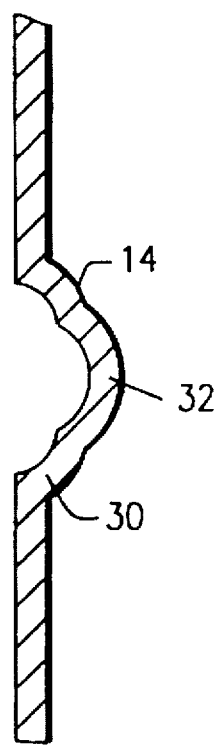
FIG. 5a is a detailed view of the sidewall rib of FIG. 5.

As shown in FIGS. 1-3 outlet box 20 has a reinforcing element disposed on each of the sidewalls 4. The reinforcing element includes exterior indentations 13 extending substantially parallel to lip 12 and projecting inwardly toward box interior 6 forming an inwardly protruding sidewall rib 14. The sidewall ribs 14 are located on each of the sidewalls 4 adjacent to lip 12. The sidewall ribs 14, as shown in FIG. 5, have a generally U-shaped cross-section with a bottom portion 30 and a top 32 portion. Bottom portion 30 is wider than top portion 32. The sidewall ribs 14 are preferably formed on the sidewalls by a stamping operation.

As further shown in FIGS. 1-3, corners 16 are formed where the sidewalls 4 join. In the preferred embodiment outlet box 20 is of unitary construction and is formed from a single piece of drawn material. Therefore, the sidewalls 4 are integrally formed with corners 16. The corners 16 are rounded and provide a generally smooth transition from one sidewall to the adjacent sidewall. Each corner 16 has a bottom portion 18 which curves inwardly toward bottom wall 2 and has a generally rounded trapezoidal shape which provides structural reinforcement to said box.

Figure 4:
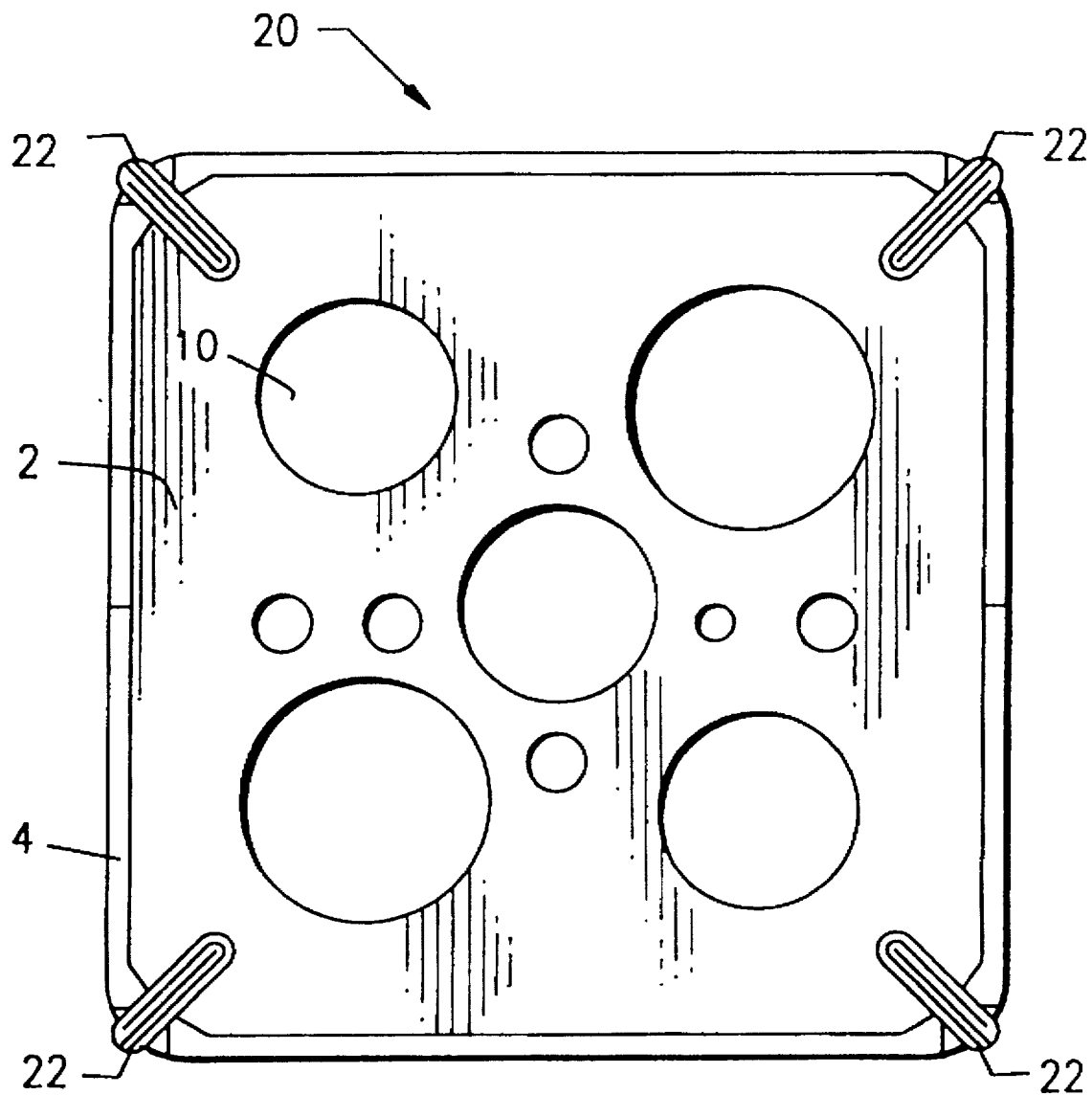
FIG. 4 is a bottom elevational view of the thin wall electrical outlet box.

In addition, each corner 16 has a corner rib 22 which extends from the center of the corner 16 downwardly across bottom portion 18 and onto bottom wall 2 as shown in FIG. 4. Corner rib 22 is preferably a protrusion extending outwardly formed by an indentation 21 in corner 16. Corner rib 22 has a cross-section similar to the cross-section of sidewall rib 14. Both bottom portions 18 and corner ribs 22 provide structural reinforcement to outlet box 20, thereby increasing the outlet box's 20 ability to sustain significant forces and moments.

The use of ribs 14, 22 provide a localized volume increase of material which results in increased resistance to deformation. The rib also provides support to the surrounding material thereby increasing the overall strength of the area adjacent to the rib. Furthermore, the size and location of sidewall and corner ribs, 14 and 22, is very important in maximizing the increased strength benefits these ribs provide.

In the preferred embodiment, outlet box 20 is a four-inch square box wherein the distance between the opposing walls is four inches. The box is preferably formed by a drawing process whereby the box is produced from one piece of material. The sidewall ribs 14 are approximately 2.6 inches in length and the lateral midline l of the rib 14, as shown in FIG. 3, is approximately 0.138 inches below lip 12. Each of the corner ribs 22 extends from approximately the lateral midline l' of box 20 downwardly onto the bottom wall 2 such that the rib ends on the bottom wall approximately 0.669 inches from the corner. The bottom 2 and sidewall 4 of the preferred embodiment have a thickness of 0.047 inches. Furthermore, each of the ribs 14 and 22 have a thickness of approximately 0.047 inches.

With ribs 14 and 22 so located and with the other features of box 20 the wall thickness of 0.047 inches provides an outlet box having the structural strength equal to or greater than a prior art outlet box having a wall thickness of 0.0625 inches. Therefore, the present invention satisfies the structural requirements of the NEC using 14% less material than a similarly sized prior art outlet box having a 0.0625 inch wall thickness.

An outlet box designed in accordance with the preferred embodiment has been tested by various methods for structural integrity. A pull test subjected the box to an outwardly directional load acting on opposing sidewalls of the box. A crush test was performed with the box placed between two steel plates with its open upper end down and then subjected to a load transmitted through the plates. Finally, a cantilever test was performed in which a portion of rigid conduit tubing was secured to a sidewall of the box. A force perpendicular to the tubing was applied to the tubing at a certain distance from the box resulting in a moment being imparted to the box. Two methods of measurement were employed to calculate the results of the cantilever test. One was the Permanent Deflection Angle which corresponds to the amount of angular deflection just before plastic deformation occurs. The other method was the Horizontal Change which corresponds to the amount of horizontal travel of the tubing just before the onset of plastic deformation.

A chart comparing the force required to produce structural failure in the prior art outlet boxes and a box of the preferred embodiment is set forth below.

| Test | 0.0625" box | 0.047" box |
| --- | --- | --- |
| Pull | 946 lbs. | 1086 lbs. |
| Crush | 1518 lbs. | 2016 lbs. |
| Cantilever | | |
| Deflection Angle | 16.5° | 20° |
| Horizontal Change | 4.32" | 4.54" |

As can be seen the construction of the present invention provides higher values of structural integrity with only minimal increases in cantilever deflection.

Figure 6:
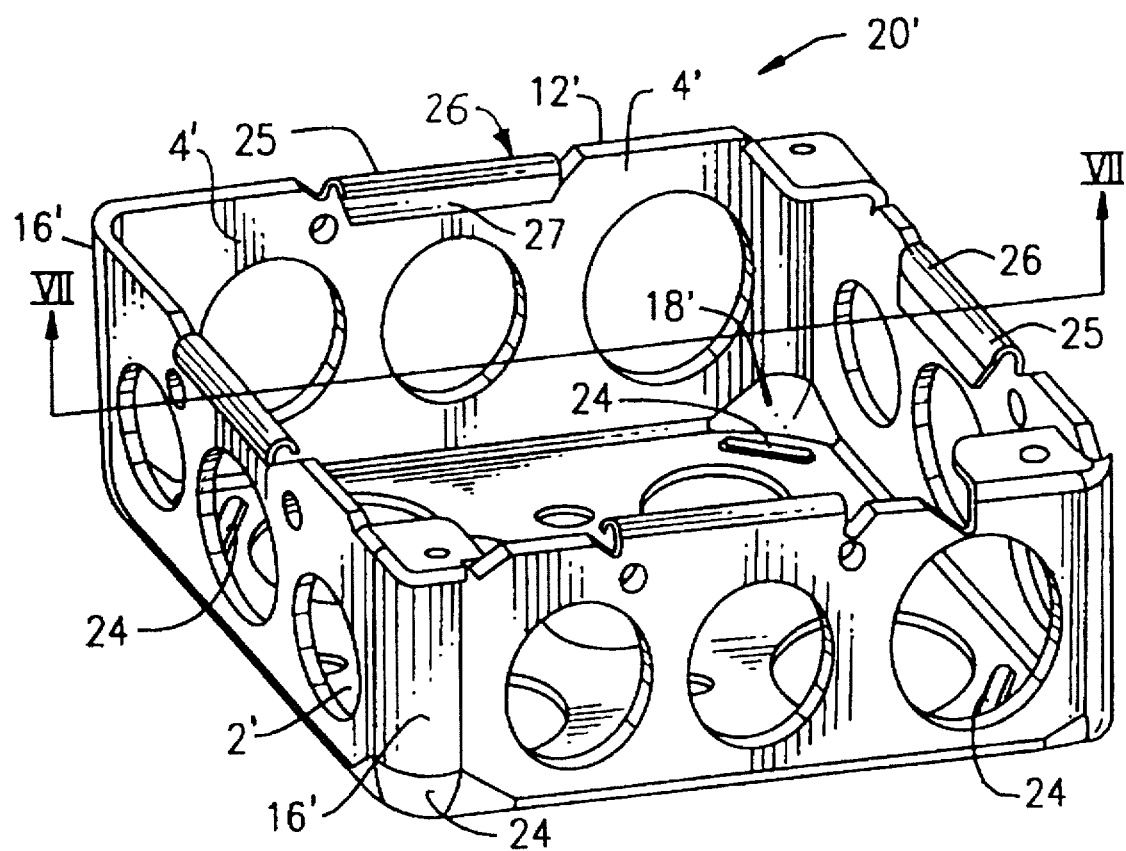
FIG. 6 is a perspective view an alternative embodiment of the thin wall electrical outlet box.
Figure 7:
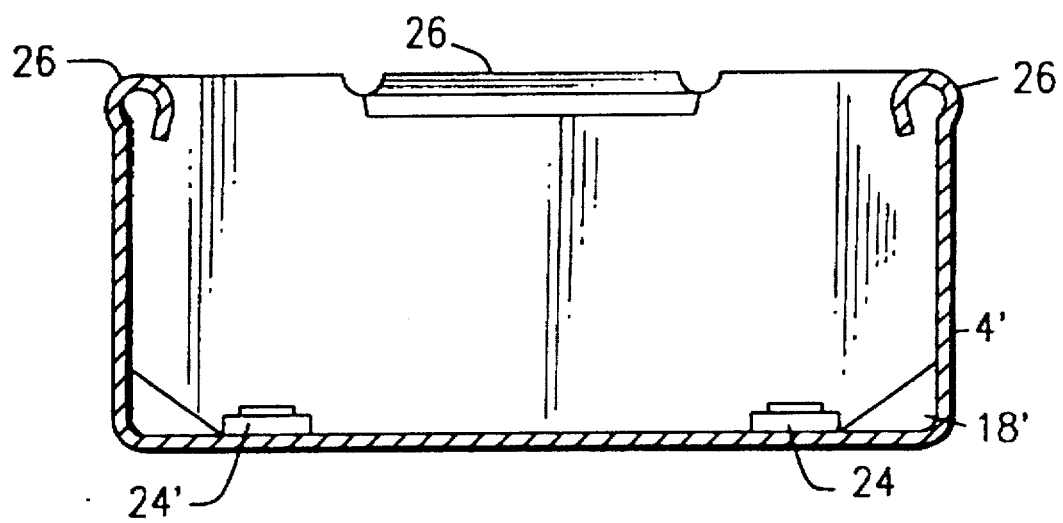
FIG. 7 is a vertical cross-section of the thin wall electrical outlet box of FIG. 6 taken through lines VII—VII thereof.

An alternative embodiment of the present invention is shown in FIGS. 6 and 7. While many of the features are similar to outlet box 20 of the preferred embodiment, the reinforcing means are different. As shown in FIGS. 6 and 7, outlet box 20' includes bottom ribs 24 located on bottom wall 2' with one rib adjacent to each of the corners 16'. An indentation in bottom wall 2' forms a protrusion which extends upwardly forming bottom rib 24. Each bottom rib 24 has a similar cross-section to the previously described ribs of the preferred embodiment, 14 and 22 of FIG. 1. Bottom rib 24 extends diagonally from one sidewall to the adjacent sidewall and is substantially parallel to corner bottom portion 18'. Bottom ribs 24 provide crush resistance to the box 20' thereby increasing the ability of box 20' to withstand crushing forces.

Each sidewall 4' contains a lip roll 26 which protrudes from lip 12'. Each lip roll 26 is located substantially in the center of the corresponding sidewall 4' and runs parallel to the same. The lip roll 26 is preferably formed by bending a portion 25 of the lip protruding from the sidewall 4' toward the box interior so that the top of the lip roll 27 points toward bottom wall 2'.

Figure 9:
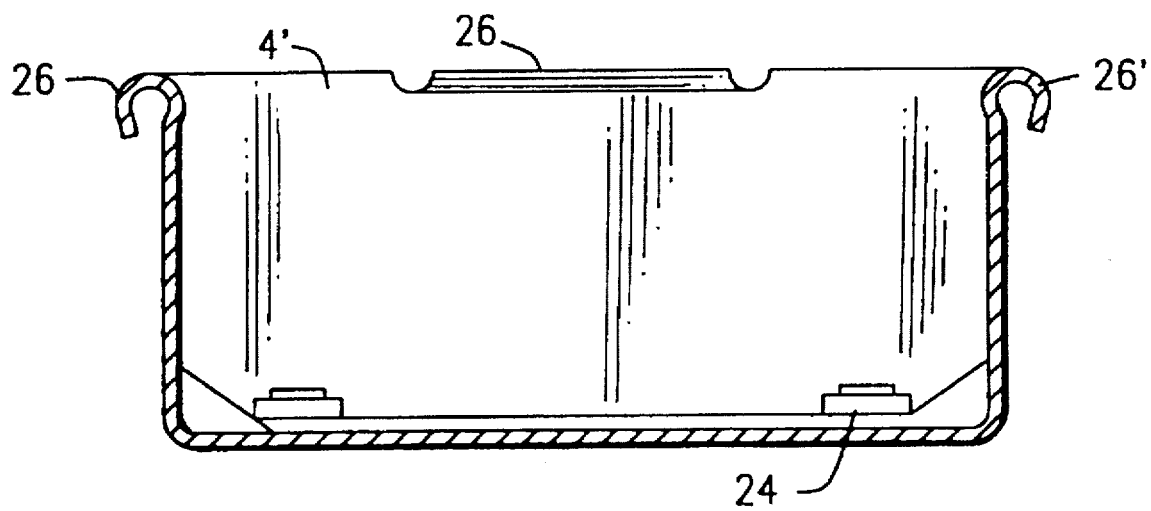
FIG. 9 is a vertical cross-section of the thin wall electrical outlet box of FIG. 8 taken through lines IX—IX thereof.
Figure 8:
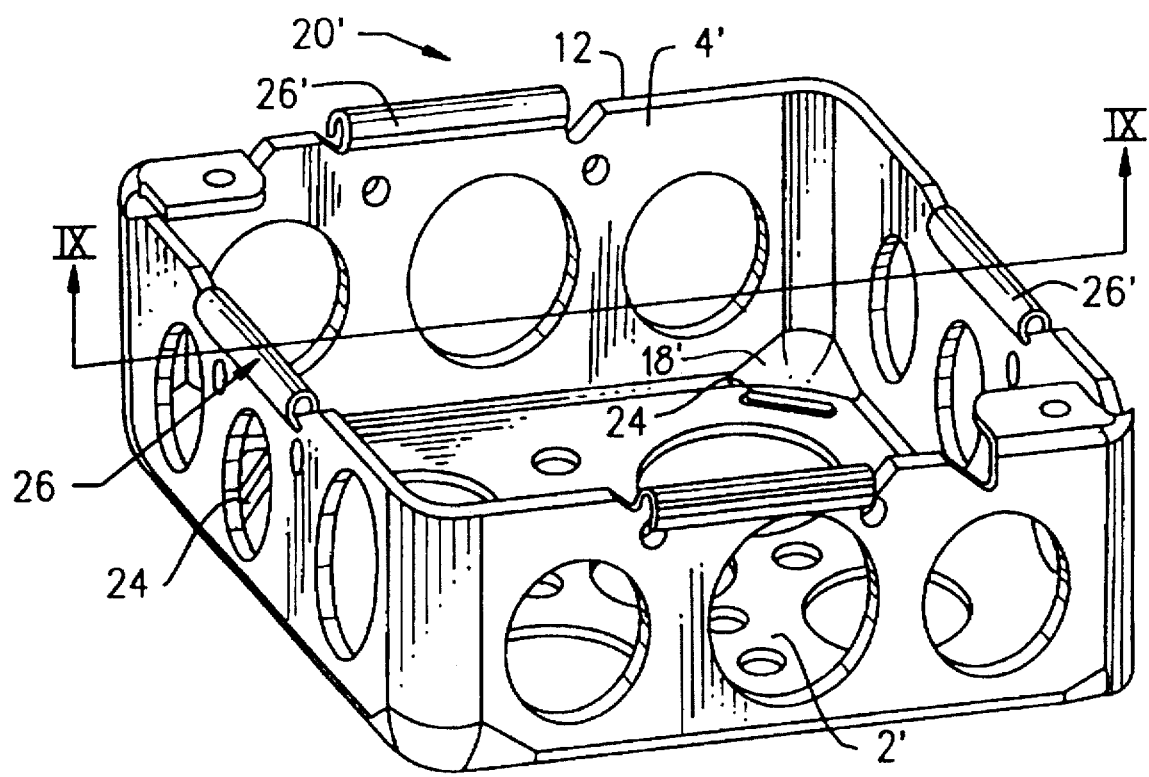
FIG. 8 is a perspective view an alternative embodiment of the thin wall electrical outlet box.

Alternatively, the lip roll 26' may be formed such that the lip 12' is bent outwardly as shown in FIGS. 8 and 9. Additionally, outlet box 20' may incorporate a mixture of inwardly and outwardly extending lip rolls, 26 and 26', as shown in FIGS. 8. and 9. The lip rolls provides box 20' with pull and bend resistance.

We claim:

1. A thin wall electrical outlet box comprising:
   a bottom wall;
   an upwardly extending perimeter wall bounding said bottom wall and defining a lip at an upper end thereof, said perimeter wall including a plurality of upwardly extending sidewalls, said sidewalls being joined together forming a plurality of corners,
   said upper end defining a box interior; and
   a means for providing localized reinforcement, including sidewall reinforcing means disposed on each of said sidewalls adjacent to said lip and corner reinforcing means including a plurality of ribs, one of said ribs being disposed adjacent to each of said corners, each rib having a bottom U-shaped portion and a top U-shaped portion extending from said bottom portion, said top portion having a width less than that of said bottom portion.

2. The thin wall electrical outlet box of claim 1 wherein the box is formed from one continuous piece of material.

3. The thin wall electrical outlet box of claim 1 wherein said sidewall reinforcing means further includes a rib disposed on each of said sidewalls, each of said ribs longitudinally extending substantially parallel to and adjacent to said lip.

4. The thin wall electrical outlet box of claim 1 wherein each of said corners has a bottom portion intersecting and joined to said bottom wall, said bottom portion having a generally trapezoidal shape providing reinforcement to said box.

5. The thin wall electrical outlet box of claim 3 wherein said ribs on said sidewalls have a bottom U-shaped portion and a top U-shaped portion extending from said bottom portion, said top portion has a width less than that of said bottom portion.

6. The thin wall electrical outlet box of claim 1 wherein said sidewall reinforcing means includes a portion of said lip rolled downwardly onto a respective one of said sidewalls, each of said sidewalls having an inner and an outer surface.

7. The thin wall electrical outlet box of claim 6 wherein each of said corners has a bottom portion intersecting and joined to said bottom wall, said bottom portion has a generally trapezoidal shape providing structural reinforcement to said box.

8. The thin wall electrical outlet box of claim 1 wherein each of said ribs upwardly projects from said bottom wall and extends diagonally from one sidewall to an adjacently located sidewall.

9. The thin wall electrical outlet box of claim 6 wherein said lip portion is rolled downwardly onto said outer surface of said sidewall and said lip portion is substantially centrally located on said sidewall.

10. The thin wall electrical outlet box of claim 6 wherein said lip portion is rolled downwardly onto said inner surface of said sidewall and said lip portion is substantially centrally located on said sidewall.

11. The thin wall electrical outlet box of claim 1 wherein said box further includes a pair of opposed ears extending inwardly toward the interior of said box, said ears being integrally formed on said perimeter wall and disposed adjacent to said lip, said ears having an aperture therethrough adapted to threadedly engage a fastening element.

12. The electrical outlet box of claim 1 wherein said box is formed of sheet metal.

13. The thin wall electrical outlet box of claim 1 wherein said perimeter wall and said bottom wall are formed of metal and have a nominal thickness of approximately 0.047 inches.

14. The thin wall electrical outlet box of claim 1 wherein said bottom wall and said sidewalls each have a plurality of apertures for receiving electrical wiring.

15. The thin wall electrical outlet box of claim 1 wherein said box has four of said sidewalls.

16. The thin wall electrical outlet box comprising:
    a bottom wall;
    a plurality of upwardly extending sidewalls perimetrically bounding said bottom wall and defining a lip at an upper end thereof, said sidewalls being joined together forming a plurality of corners;
    said upper end defining a box interior;
    sidewall reinforcing means including a rib disposed on each of said sidewalls adjacent to said lip longitudinally extending substantially parallel to said adjacent lip and projecting inwardly toward said box interior;
    corner reinforcing means including a plurality of outwardly projecting ribs, each rib extending downwardly from a point on said corner between said lip and said bottom wall onto said bottom wall; and
    said ribs on said sidewalls and said corners each having a bottom U-shaped portion and a top U-shaped portion extending from said bottom portion, said top portion having a width less than that of said bottom portion.

17. A thin-wall electrical outlet box comprising:
    a bottom wall;
    an upwardly extending perimeter wall bounding said bottom wall and defining a lip at an upper end thereof, said perimeter wall including a plurality of upwardly extending sidewalls each sidewall having an inner and an outer surface, said sidewalls being joined together forming a plurality of corners, said upper end defining a box interior, and a means for providing localized reinforcement including;

sidewall reinforcing means being disposed on each of said sidewalls adjacent to said lip, said sidewall reinforcing means including a portion of said lip rolled downwardly onto a respective one of said sidewalls forming a lip roll; and corner reinforcing means including a plurality of ribs, one of said ribs being disposed adjacent to each of said corners; and each of said ribs upwardly projecting from said bottom wall and extending diagonally from one side wall to an adjacently located side wall.

18. The thin wall electrical outlet box of claim 17 wherein each of said corners has a bottom portion intersecting and joined to said bottom wall, said bottom portion has a generally trapezoidal shape providing structural reinforcement to said box.

19. The thin wall electrical outlet box of claim 17 wherein each of said ribs has a bottom U-shaped portion and a top U-shaped portion extending from said bottom portion, said top portion having a width less than that of said bottom portion.

20. The thin wall electrical outlet box of claim 17 wherein said lip portion is rolled downwardly onto said outer surface of said sidewall and said lip roll is substantially centrally located on said sidewall.

21. The thin wall electrical outlet box of claim 17 wherein said lip portion is rolled downwardly onto said inner surface of said sidewall and said lip roll is substantially centrally located on said sidewall.

22. A thin wall electrical outlet box comprising:

a bottom wall;

an upwardly extending perimeter wall bounding said bottom wall and defining a lip at an upper end thereof, said perimeter wall including a plurality of upwardly extending sidewalls each having an inner and an outer surface, said sidewalls being joined together forming a plurality of corners, said upper end defining a box interior; and a means for providing localized reinforcement including sidewall reinforcing means being disposed on each of said sidewalls adjacent to said lip and corner reinforcing means being disposed adjacent to each of said corners;

said sidewall reinforcing means including a portion of said lip rolled downwardly onto a respective one of said sidewalls forming a lip roll, and said corner reinforcing means including a rib having a bottom U-shaped portion and a top U-shaped portion extending from said bottom portion, said top portion having a width less than that of said bottom portion.

* * * * *